United States Patent [19]

Barton

[11] Patent Number: 5,502,840
[45] Date of Patent: Mar. 26, 1996

[54] METHOD AND APPARATUS FOR ADVISING A REQUESTING PROCESS OF A CONTENTION SCHEME TO EMPLOY TO ACCESS A SHARED RESOURCE

[75] Inventor: Richard R. Barton, Lexington, S.C.

[73] Assignee: NCR Corporation, Dayton, Ohio

[21] Appl. No.: 497,961

[22] Filed: Jul. 3, 1995

Related U.S. Application Data

[63] Continuation of Ser. No. 300,984, Sep. 6, 1994, abandoned, which is a continuation of Ser. No. 987,990, Dec. 9, 1992, abandoned, which is a continuation of Ser. No. 645,073, Jan. 18, 1991, abandoned.

[51] Int. Cl.$^6$ .................................................. G06F 13/14
[52] U.S. Cl. ...................... 395/726; 364/DIG. 1; 364/228.1; 364/228.3; 364/246.8; 364/281.5
[58] Field of Search ........................ 395/200.06, 856, 395/287, 288, 474, 477, 479, 726, 728, 650, 700, 800; 340/825.5, 825.3; 455/26.1

[56] References Cited

U.S. PATENT DOCUMENTS

| | | | |
|---|---|---|---|
| 4,131,941 | 12/1978 | Siegel et al. | 395/775 |
| 4,320,451 | 3/1982 | Bachman et al. | 395/650 |
| 4,394,725 | 7/1983 | Bienvenu et al. | 395/375 |
| 4,403,285 | 9/1983 | Kikuchi | 395/650 |
| 4,435,766 | 3/1984 | Haber et al. | 395/726 |
| 4,438,494 | 3/1984 | Budde et al. | 395/575 |
| 4,447,874 | 5/1984 | Bradley et al. | 395/650 |
| 4,480,304 | 10/1984 | Carr et al. | 395/725 |
| 4,486,830 | 12/1984 | Taylor, Jr. et al. | 364/146 |
| 4,493,027 | 1/1985 | Katz et al. | 395/375 |
| 4,495,570 | 1/1985 | Kitajima et al. | 395/650 |
| 4,525,780 | 6/1985 | Bratt et al. | 395/425 |
| 4,574,350 | 3/1986 | Starr | 395/726 |
| 4,587,609 | 5/1986 | Boudreau et al. | 395/725 |
| 4,590,555 | 5/1986 | Bourrez | 395/650 |
| 4,594,657 | 6/1986 | Byrns | 395/729 |
| 4,663,709 | 5/1987 | Fujiwara et al. | 395/725 |
| 4,979,105 | 12/1990 | Daly et al. | 395/575 |
| 5,050,072 | 9/1991 | Earnshaw et al. | 395/325 |
| 5,129,089 | 7/1992 | Nielsen | 395/726 |
| 5,175,852 | 12/1992 | Johnson et al. | 395/600 |
| 5,202,990 | 4/1993 | Saikawa | 395/650 |
| 5,280,619 | 1/1994 | Wang | 395/726 |
| 5,287,521 | 2/1994 | Nitta et al. | 395/726 |
| 5,319,780 | 6/1994 | Catino et al. | 395/600 |

Primary Examiner—Thomas C. Lee
Assistant Examiner—Lance L. Barry
Attorney, Agent, or Firm—Jack R. Penrod; Paul W. Martin

[57] ABSTRACT

A method and apparatus in a multiprocessor computer system which advises a requesting process of how it should wait for a system process having shared data and/or shared resources that is currently occupied by another process. The method begins by storing data representing the state of the synchronization lock of the requested process in a memory within the computer system. A first processor acquires exclusive access to the data. The first processor reads the data. The first processor determines from a synchronization lock owner portion of the data if the synchronization lock of the requested process is currently owned by either the requesting process or another process executing on a second processor within the computer system, and if it is owned determines if the contention process indicated in an advice portion of the data is appropriate for the requesting process. If the contention process is appropriate, the first processor releases the exclusive access to the data and performs the contention process indicated by the advice portion of the data. If the contention process is not appropriate, the first processor releases the exclusive access to the data and performs a default contention process predetermined by the requesting process.

6 Claims, 4 Drawing Sheets

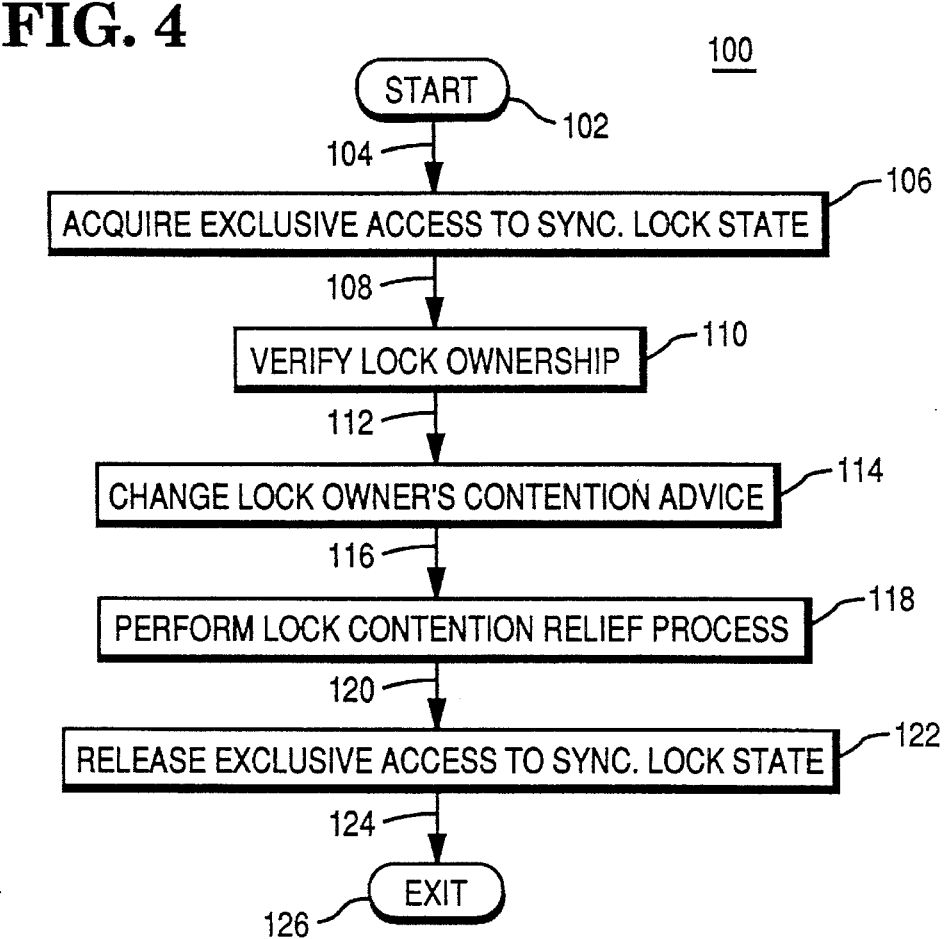
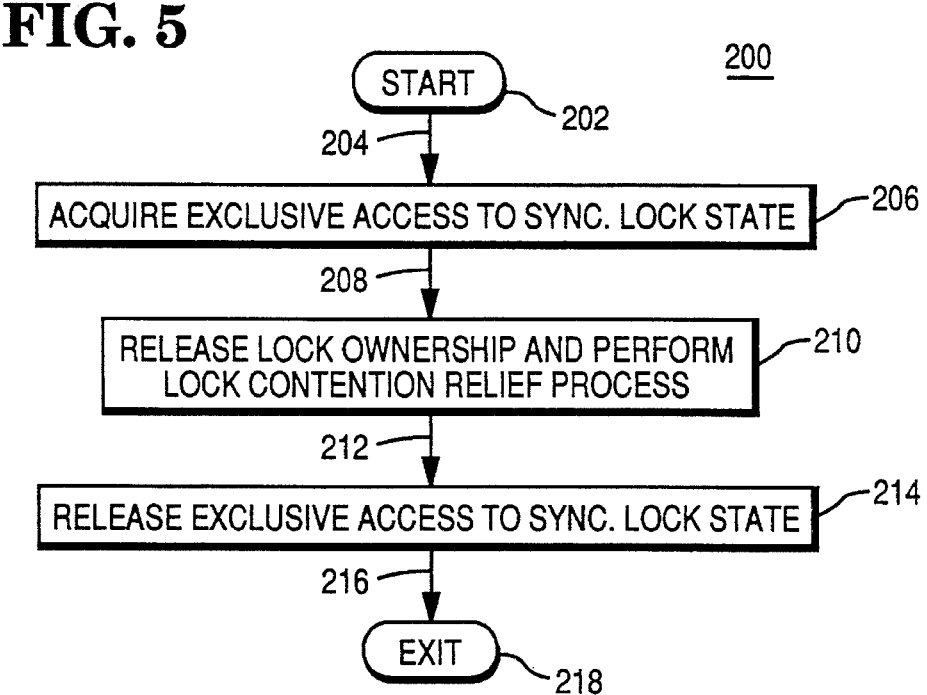

METHOD AND APPARATUS FOR ADVISING A REQUESTING PROCESS OF A CONTENTION SCHEME TO EMPLOY TO ACCESS A SHARED RESOURCE

This is a continuation of application Ser. No. 08/300,984, filed Sep. 6, 1994, now abandoned; which is a continuation of Ser. No. 07/987,990, filed Dec. 9, 1992, now abandoned; which is a continuation of Ser. No. 07/645,073, filed Jan. 18, 1991, now abandoned.

BACKGROUND OF THE INVENTION

The present invention relates to computer systems having multiple parallel processors, and more particularly to a method for a process requiring access to another process that is currently occupied to determine the most advantageous action to take until the required process is not occupied.

In systems with multiple parallel processors, data and resources are typically shared by the various tasks being performed by the processors. Any time data are shared among multiple processors in a system, some facility must be provided to ensure the coherency of the shared data. This means that while one processor has access to the shared data, no other processor may access and change the shared data. Similarly some facility must be provided to ensure the coherency of data provided to a shared resource and its software interface. For example, something must prevent two or more processors from outputting data from two different files to a shared printer at the same time. Otherwise, the page printed may have characters and words that are an unintelligible and incoherent admixture of the two data files.

A typical way to ensure the coherency of shared data and shared resources in "UNIX" computer systems ("UNIX" is a registered trademark of AT&T Corporation) and computer systems with operating systems similar to "UNIX" is to provide a synchronization lock for the shared data or resource. The synchronization lock locks out access by another processor or process until the current process, referred to as the owner, has completed its access.

The capability to lock out all other processes and processors for the period of the required access is provided by the synchronization lock. This is accomplished by a portion of the process that accesses the shared data or resource first requesting ownership of the synchronization lock by means of a locking synchronization process, called a primitive, before actually accessing the shared data or resource. If the synchronization lock is not owned at the time, the requesting process is assigned ownership of the requested synchronization lock and the requesting and owning process makes the necessary access to the shared data or resource. After the access is completed, the requesting and owning process releases the shared data or resource by means of an unlocking synchronization primitive. Such operation is well known by those versed in operating the "UNIX" operating system.

A problem arises when a second process requests access to a shared process that is currently occupied by some process. In such a case when the second process requests ownership of the synchronization lock of the shared data or resource, the second process will discover from the synchronization lock data that such ownership is not currently possible. Since the requested shared data or resource is not available, the second process can take one of two options: it can wait briefly and try again which is often referred to as "spinning", or it can store its present status and enter a "sleep" mode in which the second process is inactive until the requested data or resource is available again. Spinning wastes processing time because no useful work is accomplished by the processor of the second process while it is waiting for the requested process. Sleeping wastes processing time because while the second process sleeps, its processor unloads the context and the data of the second process and begins to load and run a third process; therefore, when the requested shared data or resource is available again, the second process must be awakened and reloaded. Thus, for short waits spinning is best because context switching and loading times are saved, and for long waits sleeping is best because another process can use the processor while the second requesting process is sleeping. Unfortunately, the second requesting process cannot know if it will have a short wait (and therefore it should spin) or a long wait (and therefore it should sleep).

Therefore, it is an object of this invention to provide a method for advising a requesting process of a preferred process of waiting until the requesting process obtains ownership of a synchronization lock of a requested process that is not currently available.

It is another object of this invention to provide a method for indicating to a requesting process that a synchronization lock is not currently available and advising the requesting process approximately how long it will be until the synchronization lock will be available again.

It is a further object of this invention to provide a method for providing advice and revising advice to a requesting process regarding a preferred process of waiting until the requesting process obtains ownership of a synchronization lock associated with the requested process.

SUMMARY OF THE INVENTION

According to one aspect of the invention, the foregoing objects are achieved by providing a method for advising a requesting process of a state of a synchronization lock of a requested process, including the steps of: acquiring exclusive access to data representing the state of the synchronization lock of the requested process; reading this data and determining if the synchronization lock of the requested process is currently owned by any process and if it is owned, determining if a contention process indicated in an advice portion of the synchronization lock data is appropriate for the requesting process; releasing the exclusive access to the synchronization lock data; and performing the contention process indicated by the advice portion of the data of the synchronization lock of the requested process.

In another aspect of the invention, the aforementioned objects are achieved by providing a method for advising a requesting process of a state of a synchronization lock of a requested process, including the steps of: acquiring exclusive access to data representing the state of the synchronization lock of the requested process as a starting point; reading the data and determining if the synchronization lock of the requested process is currently not owned by any process and if it is not owned, skipping to the assigning operation otherwise reading the lock contention advice data associated with the process currently owning the synchronization lock; releasing the exclusive access to the data representing the state of the synchronization lock; performing a contention process indicated by the contention advice data of the synchronization lock of the requested process; returning to the starting point if the requesting process has not fulfilled its requested access to the requested process, otherwise assigning the requesting process as the current owner of the synchronization lock of the requested process; revising the data representing the state of the synchronization lock of the requested process with the lock contention advice data associated with the requesting process; releasing the exclusive access to the data representing the state of the synchronization lock; and exiting the process for advising a requesting process of a state of a synchronization lock.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

FIG. 4 is a block diagram of a process flow that provides an update to the contention advice as the state of the requested process changes.

FIG. 5 is a block diagram of a process flow that provides a release by the current owner of the synchronization lock of the requested process so that the lock may be acquired by another process.

DETAILED DESCRIPTION OF A PREFERRED EMBODIMENT

Figure 1:
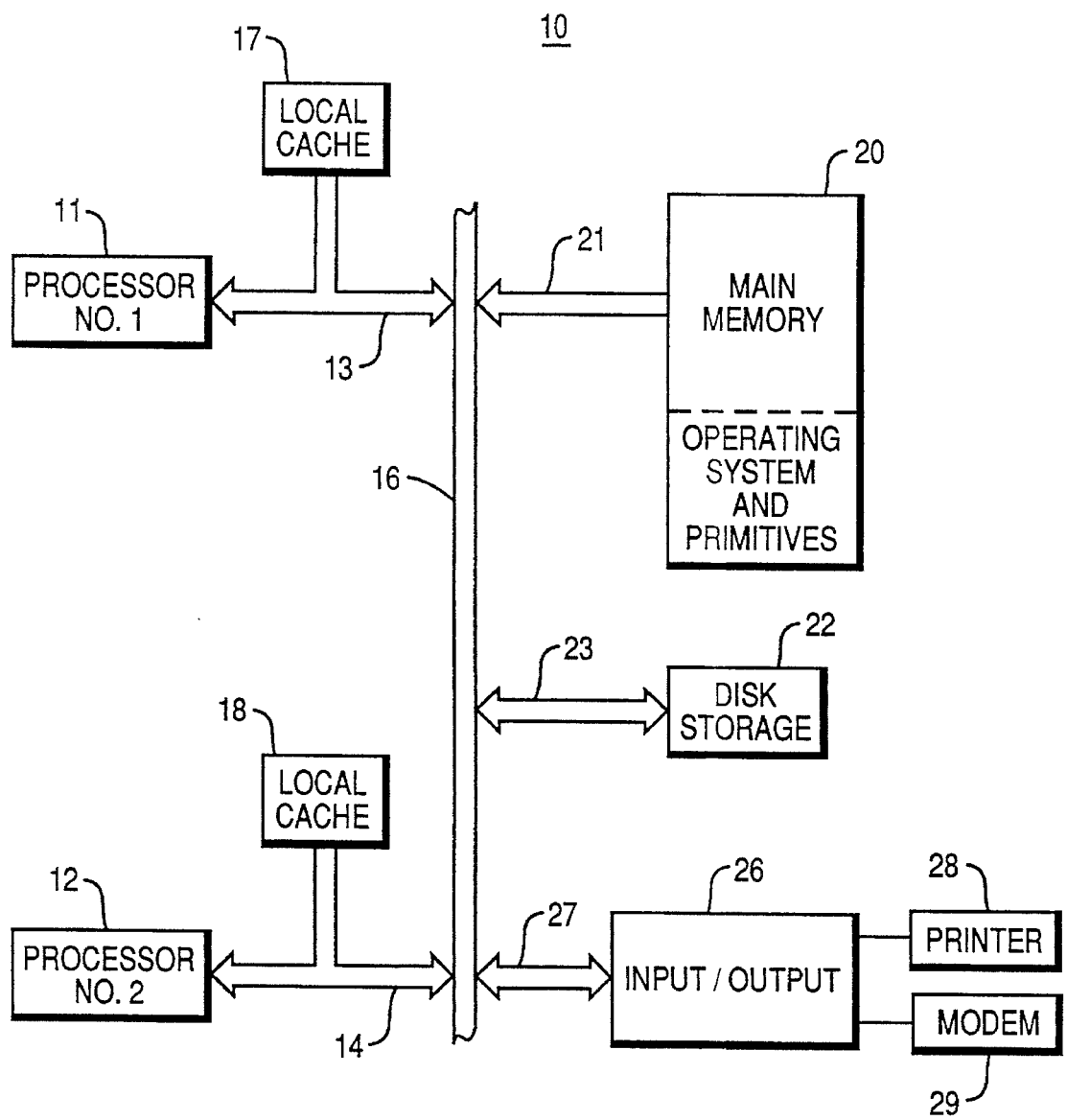
FIG. 1 is a block diagram of a multiple processor system useful for practicing the invention.

FIG. 1 shows a general multiple processor system 10 of a type that is useful for practicing the invention. The processors 11 and 12 are each connected via respective local buses 13, 14 to a shared system bus 16. Each processor also has a respective local cache 17, 18 connected to its respective local bus 13, 14.

A main memory 20 is connected to the system bus via bus 21. Typically the main memory 20 has a copy of the operating system and its associated primitive processes therein. The main memory 20 typically maintains a copy of shared data if it is not swapped out to virtual memory.

A disk storage subsystem 22 is also connected to the system bus 16 via a bus 23. Typically the long term storage of the operating system and its associated primitive processes are permanently stored in the disk storage subsystem 22 and loaded into the main memory 20 during an initialization. The disk storage subsystem 22 also provides virtual storage when used in conjunction with an operating system that uses the disk memory as virtual memory, such as the UNIX Operating System.

An input/output subsystem 26 is connected via a bus 27 to the system bus 16. The input/output subsystem 26 provides connections between shared devices such as a printer 28, a modem 29, et cetera.

Figure 2:
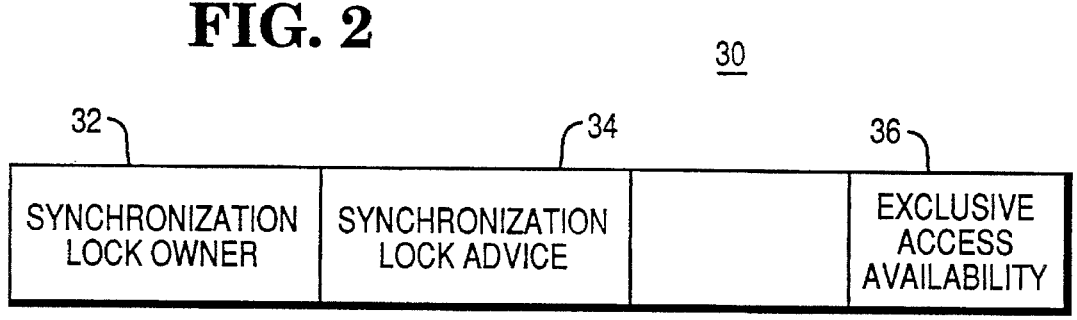
FIG. 2 is a block diagram illustrating an apportionment of state data of a synchronization lock.

Referring to FIG. 2, the state data 30 which described the state of a synchronization lock of a specific process, such as stored data or a driver of a specific printer. The state data 30 has a field 32 in which the owner of the synchronization lock, i.e. the process and/or processor that is currently using the process that is associated with the synchronization lock, is stored in some binary form. The state data 30 also has a synchronization lock advice field 34 in which advice suggesting contention processes to perform or indicating a time period to try again may be encoded. An exclusive access availability field 36 may further be included. Since the synchronization lock data 30 may only be accessed by one process at a time for WRITE operations, this availability field 36 may be READ to determine if the synchronization lock is available or not.

Figure 3A:
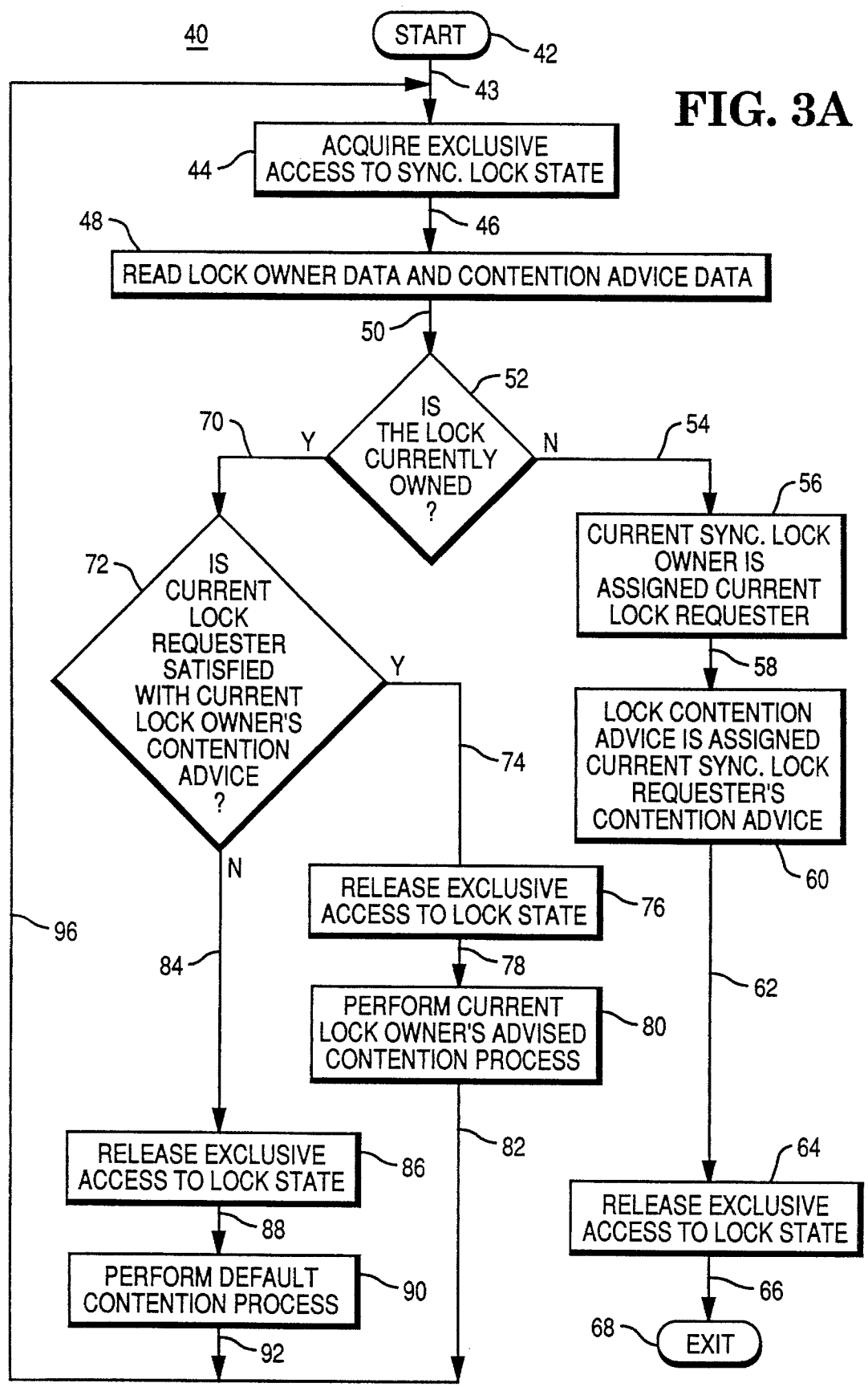
FIG. 3A is a block diagram of a process flow that provides contention advice to a requesting process according to one embodiment of the invention.

Referring now to FIGS. 2 and 3A, details of the flow of a method 40 are illustrated in accordance with the present invention. The method 40 advises a requesting process of one of the multiple processors 11, 12 (shown in FIG. 1) of a state of a synchronization lock primitive process which may or may not be currently used by one of the other processors.

The method 40 begins at start 42 and follows path 43 to action 44. At action 44 the requesting processor 11, 12 acquires exclusive access to state data 30 of a synchronization lock of a shared process. This is typically accomplished by examining the availability field 36 and if the synchronization lock is not available trying again until exclusive access to the synchronization lock state data is acquired. From the operation 44, the method 40 follows path 46 to an operation 48 which reads the lock synchronization owner field 32 and the synchronization lock advice field 34 suggesting a contention process until the current owner has completed its transaction with the shared process. After reading these fields, the method 40 follows path 50 to an action 52 which examines the data in the field 32 and determines if the synchronization lock, and thus the shared process associated with the synchronization lock, is currently owned by any process. If the synchronization lock is not owned, the method 40 follows path 54, and if it is owned, the method 40 follows path 70.

Path 54 continues to an operation 56 in which the current requesting process that has acquired exclusive access to the synchronization lock state data 30 is assigned as the current synchronization lock owner, i.e. its process identification code is written into the synchronization lock owner field 32. At the completion of the action 56, the the method 40 follows a path 58 to an operation 60. The operation 60 assigns, i.e. writes, lock contention advice associated with the current requesting process, which is the current owner. This lock contention advice can be predetermined from an estimate of the requirements of the requesting process or it could be dependent upon the state of the requesting process requirement when it acquired ownership of the synchronization lock. Furthermore, the lock contention advice may be revised as the requested process progresses.

After the operation 60, the method 40 follows path 62 to an operation 64 in which the requesting process releases its exclusive access to the synchronization lock data of the requested process. This is to enable other requesting processes to access the synchronization lock state data and read the advice written in the advice field 34 by the current owning process. After the releasing operation 64, the method 40 follows a path 66 to an exit 68, which is the end of the method 40.

Referring back to the action 52, if the synchronization lock is currently owned by a process the method 40 follows a path 70 to an action 72. At the action 72, the requesting process and its processor 11, 12 determines if it is satisfied, i.e. agrees with, the contention advice read from advice field 34 at the operation 48. If the requesting process and processor 11, 12 are satisfied with the contention advice, the method 40 follows a path 74 to an operation 76. Conversely, if the requesting process and processor 11, 12 are not satisfied with the contention advice, the method 40 follows a path 84 to an operation 86.

The path 74 is the normal path according to the invention for requesting processes to take if another process and processor 11, 12 own the synchronization lock of the shared process. The requesting process has not been granted ownership of the synchronization lock of the requested shared process, but it has been advised according to the present invention on the best way to wait until the synchronization lock of the shared process is available to be contended for and owned by this or some other requesting process. After accepting the contention advice, the requesting process and processor 11, 12 release their exclusive access to the synchronization lock state data by writing an appropriate entry into the field 36. Upon the release of the the access to synchronous lock data, the method continues along path 78 to an operation 80.

At the operation 80, the requesting process and its respective processor 11, 12 perform the contention process advised by the synchronization lock owner. For example, the requesting process could perform a spin lock in which the requesting process briefly waits and then returns along path 82, 96 to the start position 42 and tries again to acquire ownership of the requested shared process. If the synchronization lock is still not available and the contention advice has not changed, the spin lock process may be repeated. Alternately, the contention advice may be for the requesting process go to sleep so its resources and especially its processor may be reassigned to other processes and processors.

At the operation 86, the requesting process and its respective processor 11, 12 perform a default contention process because it was not satisfied with the contention process advised by the synchronization lock owner. For example, the requesting process may be an interrupt handling process and thus may require almost immediate acquisition of the requested process. In such cases, only a spin lock process in which the requesting process briefly waits and then returns along path 92, 96 to the start position 42 to try again would be appropriate until ownership of the requested process is acquired.

Statistically, each of the requesting processes will return to the start position 42 and repeat the method 40 until each has acquired ownership of the requested process and performed their necessary processes, and then all of the requesting processes of the method 40 exit the synchronization lock at the exit operation 68.

Figure 3B:
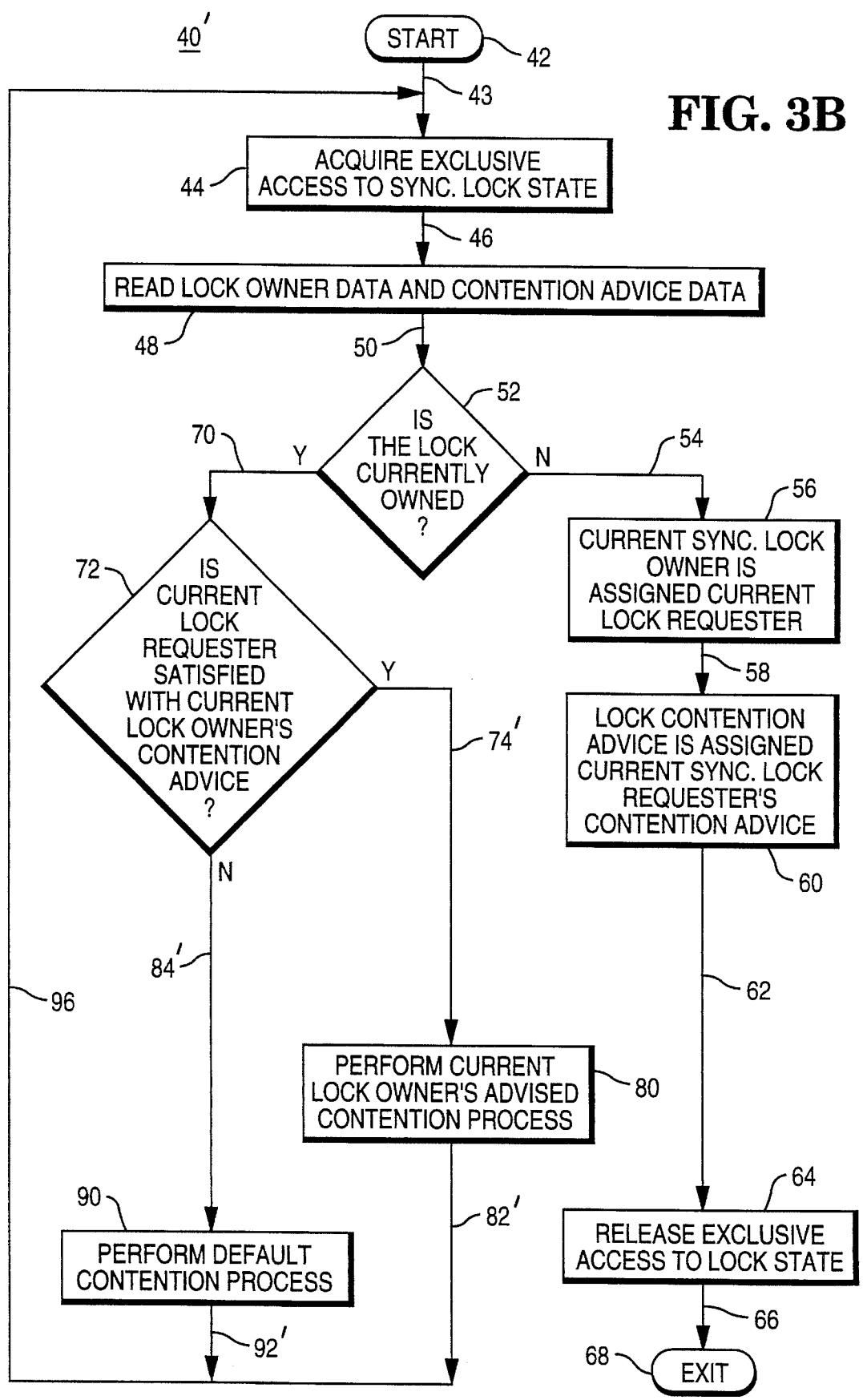
FIG. 3B is a block diagram of a process flow that provides contention advice to a requesting process according to a second embodiment of the invention.

FIG. 3B illustrates a variation of the method 40 shown in FIG. 3A. The method 40' is the same as the method 40 except that if the requesting process is satisfied with the current lock owner's contention process advice the method 40' follows a path 74' to an operation 80, and if the requesting process is not satisfied with the current owner's contention process advice, the method 40' follows a path 84' to an operation 90. At the operation 80, the requesting process performs the advised contention process. At the operation 90, the requesting process performs its default contention process instead of the advised contention process. After performing the advised contention process or the default contention process of the requesting process, the method 40' follows path 82' or path 92' to path 96 which leads back to path 43 as the others. In this embodiment, the method 40' does not release the exclusive access to the synchronization lock state data. Therefore, the contention process selected by the requesting process must include an operation analogous to operation 86 shown in FIG. 3A to release the exclusive access to the synchronization lock data. Otherwise the contention process is not limited. High priority requesting processes, such as processor interrupt handling processes, may have a very brief waiting period before they attempt again to gain exclusive access to the requested process and thereby have a better chance of acquiring ownership of the shared process than a non-high priority processes.

Referring now to FIG. 4, a method 100 of changing the contention process advice, which increases the flexibility of advisable synchronization lock processes will be described. The method 100 starts at 102 and continues along a path 104 to the operation 106 in which the owner acquires exclusive access to the synchronization lock state data. This is accomplished in a manner very similar to the operation 34 in the method 40 shown in FIG. 3A. After exclusive access is acquired the method 100 continues along path 108 to an operation 110 in which the ownership by the current process having exclusive access is verified. This is accomplished by reading the synchronization lock owner field 32 and comparing it with the process identification number of the current process having exclusive access. If the current process is verified to be the owner, the method 100 continues along path 112 to an operation 114. At the operation 114 the current process or owner is allowed to change the synchronization lock contention advice by writing data to the synchronization lock advice field 34.

The contention advice data may be change in number of circumstances. For example, a search of an address data base for the names of all persons with a specific zip code may take a substantial amount of time. Thus, another process that wished to access and perform some operation on the data of the database should be advised to perform a sleep process until the search is over. However, when the search has been through 95 per cent of the records of the data base, most of the search is completed and now another process contending for the data base might be advised to perform a spin process. Another quite necessary reason for changing the synchronization lock advice data comes when the owning process is completed, or alternatively when the next owner first acquires the synchronization lock.

After changing the synchronization lock advice field 34, the method 100 continues along path 116 to an operation at 118. At the operation 118, the owning process may initiate a contention relief process. For example, if the advice is for all contending processes to sleep, the contention relief process may include an awakening process. The contention relief process may not be needed in all cases and may be omitted. After the operation at 118, the method 100 continues along a path 120 to an operation 122. At the operation 122 the owning process releases its exclusive access to the synchronization lock data 30, and follows path 124 to the exit 126. With the exclusive access to the synchronization lock data released, method 100 may be repeated to change the advice data again, method 40 may be repeated to try to acquire ownership of the synchronization lock, or a method 200 (shown in FIG. 5) may be performed.

Referring now to FIG. 5, the method 200 releases ownership of the synchronization lock and the shared process that the lock is associated with. The method 200 has a start 202 and then continues along path 204 to an operation 206. At the operation 206 the owning process again acquires exclusive access to the synchronization lock state data 30 and then continues along a path 208 to an operation 210. At the operation 210, the owning process releases ownership of the synchronization lock. This may be accomplished by clearing the synchronization lock owner field 32, or some similar data change. As soon as the ownership of the lock has been released, any lock contention process may be performed as part of the operation 210. As in the method 100, the contention relief process may not be needed and may be omitted. After the operation at 210, the method 200 continues along a path 212 to an operation 214. At the operation 214, the method 200 releases exclusive access of the previously owning process to the synchronization lock data 30. After the operation 214, the method 200 follows a path 216 to an exit 218, which signifies that the synchronization lock and its associated shared process is no longer required by the process which used the shared process.

In operation in a multi-processor system, each process requesting a shared process, including shared resources, must perform the method 40 in order to acquire ownership of the synchronization lock associated with the shared process. Once it has acquired ownership, the owning process must perform the method 200 to release its ownership of the synchronization lock of the shared process at the completion of its actions with the shared process. In between, the owning process may change the contention process advice to other requesting processes by performing the method 100 one or more times as appropriate. By using the advice of owning process, requesting processes may make an informed decision to spin until the requested process is available or to sleep and let the processor of the requesting process be re-assigned to another process and return to the requesting process after the present owner of the requested process is finished. By using synchronization locks which advise awaiting processes, general predetermined spinning and sleeping decisions are avoided and a more efficient more flexible multiple processor operating system is achieved.

Thus, it will now be understood that there has been disclosed a method for advising a requesting process of a state of a synchronization lock of a shared process which provides a more efficient way for an awaiting process to decide whether to spin, sleep, or take some other action to conserve processing time in a multiple processor system. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A method for use in a multiple processor computer system for advising a requesting process of a state of a synchronization lock of a requested process, comprising the steps of:

a. storing data representing the state of the synchronization lock of the requested process in a memory within the computer system, the data including a synchronization lock owner portion, a synchronization lock advice portion containing a contention process, and synchronization lock availability portion;

b. acquiring exclusive access to said data by a first processor;

c. reading said data by said first processor;

d. determining from said synchronization lock owner portion of said data if said synchronization lock of said requested process is currently owned by either the requesting process or another process executing on a second processor within the computer system by the first processor and if it is owned determining if said contention process indicated in said advice portion of said data is appropriate for the requesting process;

e. if said contention process is appropriate, releasing said exclusive access to said data and performing said contention process indicated by said advice portion of said data by the first processor; and f. if said contention process is not appropriate, releasing said exclusive access to said data and performing a default contention process predetermined by said requesting process by the first processor.

2. A method for use in a multiple processor computer system for advising a requesting process of a state of a synchronization lock of a requested process according to claim 1, further comprising the steps of:

g. if said synchronization lock of said requested process is not currently owned, assigning the requesting process as the current owner of the synchronization lock of the requested process by the first processor;

h. revising the data in the synchronization lock advice portion with lock contention advice data associated with the requesting process by the first processor;

i. releasing said exclusive access to data representing the state of the synchronization lock by the first processor; and j. exiting the process for advising a requesting process of a state of a synchronization lock by the first processor.

3. A method for use in a multiple processor computer system for advising a requesting process of a state of a synchronization lock of a requested process according to claim 2, further comprising the steps of:

k. re-acquiring exclusive access to said data representing the synchronization lock of the requested process by said process owner;

l. releasing said ownership of said synchronization lock by clearing said owner portion of said data representing the state of said synchronization lock;

m. releasing said exclusive access to data representing the state of the synchronization lock; and n. exiting the process as said method completed.

4. For use in a multiple processor computer system, an apparatus for advising a requesting process of a state of a synchronization lock of a requested process, comprising:

memory means for storing the data containing information about the synchronization lock of the requested process, the data including a synchronization lock owner portion, a synchronization lock advice portion containing a contention process, and synchronization lock availability portion;

first processor means for executing the requesting process, for acquiring exclusive access said data representing the state of the synchronization lock of the requested process, for reading said data, for determining from said synchronization lock owner portion if said synchronization lock of said requested process is currently owned by either the requesting process or another process executing on a second processor means, if it is owned for determining if the contention process indicated in the advice portion of said data is appropriate for the requesting process, for releasing said exclusive access to said data and performing said contention process indicated by said advice portion of said data if said contention process is appropriate for said requesting process to perform as said requesting process tries to acquire ownership of said synchronization lock of the requested process; and for releasing said exclusive access to said data and performing a default contention process predetermined by said requesting process if said advised contention process is not appropriate.

5. A method for use in a multiple processor computer system for advising a requesting process of a state of synchronization lock of a requested process according to claim 2, further comprising the steps of:

k. re-acquiring exclusive access to said data representing the state of said synchronization lock of a requested process by said process owner;

l. reading said data and verifying from the synchronization lock owner portion that said acquiring process is the current owner of said synchronization lock;

m. revising said advise portion of said data representing the state of said synchronization lock;

n. releasing said exclusive access to data representing the state of the synchronization lock; and o. exiting the process.

6. A method for use in a multiple processor computer system for advising a requesting process of a state of synchronization lock of a requested process according to claim 5, further comprising the steps of:

p. re-acquiring exclusive access to said data representing the state of said synchronization lock of the requested process by said process owner;

q. releasing said ownership of said synchronization lock by clearing said owner portion of said data representing the state of said synchronization lock;

r. releasing said exclusive access to data representing the state of the synchronization lock; and s. exiting the process as said method completed.

* * * * *